# 2,754,172

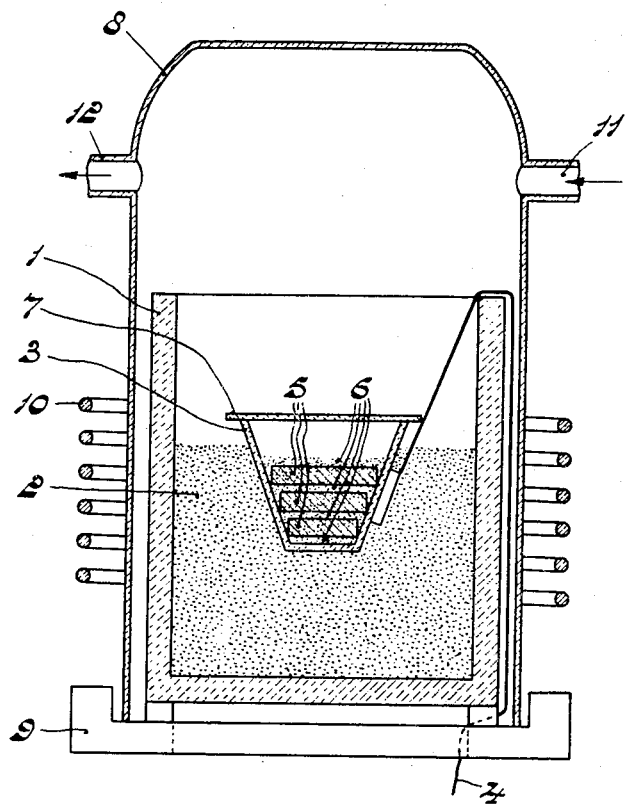
INVENTORS
JAN JACOBUS WENT
HENRICUS PETRUS JOHANNES WIJN

METHOD OF MANUFACTURING FERROMAGNETIC MATERIAL AND BODIES FOR ELECTROMAGNETIC USE MANUFACTURED FROM THIS MATERIAL

Jan Jacobus Went and Henricus Petrus Johannes Wijn, Eindhoven, Netherlands, assignors to Hartford National Bank and Trust Company, Hartford, Conn., as trustee Application June 22, 1951, Serial No. 233,094

Claims priority, application Netherlands December 8, 1950

6 Claims. (Cl. 23—51)

It has been known that certain ferromagnetic ferrites on account of their low electro-magnetic losses are excellently suitable for use at high frequency (see German Patents No. 226,347, granted January 7, 1919, and 227,787, granted February 25, 1909). The term "ferrite" is to be understood here to mean a material consisting of one or more compounds of the formula $MFe_2O_4$ or $MO.Fe_2O_3$ in which M represents a bivalent metal with suitable ion radius. The electromagnetic properties of said materials have been materially improved by more recent work (see J. L. Snoek, "Philips' Technical Review," vol. 8, Nr. 12, pages 353–360 (1946) and "New Developments in Ferromagnetic Materials" by the same author published in the series "Monographs on the Progress of Research in Holland During the War," pages 68–99 (1947)). In addition to the single ferrites such as manganese ferrite, nickel ferrite, copper ferrite and magnesium ferrite, the ferrites which hitherto have come most in the foreground (see Snoek l. c.) are mixed ferrites of said ferrites with zinc ferrite (which itself is not ferromagnetic at normal temperature). Said materials also include (see United States patent application 155,175 filed April 11, 1950, by Evert Willem Gorter) mixed ferrites of lithium ferrite ($Li_2O.5Fe_2O_3$) and zinc ferrite. The ferrites suitable for high frequency use are characterized inter alia by a cubic crystalline structure. In their crystal lattice the metal ions are ranged in a similar manner as in the mineral spinel, $MgAl_2O_4$, so that the crystalline structure of the ferrites concerned is frequently referred to as "spinel structure."

It is mentioned that an important criterion for the possession of the desired electro-magnetic properties of ferrites is that said materials consist of a single, substantially homogeneous crystal phase or mixed crystal phase (small irregularities in the structure of the crystal lattice, more particularly at the surface of the crystal and at the boundary surface between two adjacent crystals are always liable to occur). Small amounts of impurities, for example due to an excess either of bivalent or of trivalent oxide, are not troublesome so long as they can still dissolve homogeneously in the crystal phase. However, if the amount of impurities is such as to deposit in the form of a separate phase, their presence soon becomes apparent as detrimental to the electro-magnetic properties of the materials concerned.

Hitherto said materials have in most cases been manufactured by sintering a suitable mixture of ferrite-forming oxides or of a dried coprecipitate of hydroxides or carbonates of the metals concerned. This method requires greater skill since all kinds of factors such as the choice of the gaseous atmosphere during sintering and subsequent cooling and the reactivity of the starting material in most cases greatly influence the electro-magnetic properties of the reaction product, so that it sometimes requires special care to obtain reproducible results. The more so as a sintering process, in contradistinction with a melting process, in most cases require a plurality of successive operations, in practice in substantially analogous cases such as in the manufacture of permanent-magnetic materials, a melting process is preferred to a sintering process. Also in the manufacture of ferrites one would prefer to utilise a melting process the more so as products may thus be obtained which contain only very few air-cavities and consequently have a high magnetic permeability. The difficulty is, however, that the crucible material at the melting point of ferrite (about 1600°–1700°) is, as a rule, chemically attacked by the ferrite after a short time. This is enhanced by the fact that, for complete melting of the contents of a crucible, in the case of heating from the exterior the wall of the crucible requires to be heated to a temperature materially higher than the melting temperature of the ferrite.

It has previously been suggested (see Galt, Matthias and Remeika, Phys. Rev. 79, 391, 1950) to manufacture single crystals of nickel-ferrite by dissolving nickel oxide and ferric oxide in common at 1300° C. in molten borax and subsequently cooling the solution at a low rate. Single crystals having a maximum size of 2 mms. were thus obtained. However, such crystals have a comparatively high electrical conductivity and hence are not particularly suitable for use at high-frequency.

The present invention relates to a body for ferro-magnetic use, for example a magnet core, consisting of ferromagnetic material obtained by solidification from a melt, having an initial permeability $\mu_0$ of at least 20, a loss factor $\tan \delta$, measured on an annular solid core of the material, without air-gap, of 0.06 at the most at frequencies up to 10 kcs./s., the direct-current losses and the capacitive eddy-current losses of the measuring coil not included, and having a volume of pores smaller than 5%, the constituent essential to the ferromagnetic properties being constituted by substantially homogeneous cubic single crystals or mixed crystals having spinel structure, of ferrites.

According to the invention, said ferromagnetic material is manufactured in that an initial material consisting, at least for the greater part, of ferrite and/or of substances which may produce ferrite on being heated and for this purpose having a sufficient electrical conductivity, is melted by high-frequency heating and preferably by inductive high-frequency heating. The invention will hereinafter be described with reference to the use of the last-mentioned method, although capacitive high-frequency heating may also be used within the scope of the invention. True, it is already known to melt metals by means of the method of high-frequency induction, but with the ferrite materials under consideration, which are semi-conductors and hence generally have a high specific resistance, the difficulty arises that the thermal energy produced therein by the high-frequency field is insufficient to ensure satisfactory heating.

According to the invention, an increased electric conductivity of the material to be melted is provided such that the heating by means of the electro-magnetic high-frequency field is satisfactorily proceeding. Once a certain amount of ferrite of high temperature or molten ferrite being contained in the mass, the electric conductivity is sufficient to permit further heating to the melting temperature and melting of the whole mass owing to the comparatively high electric conductivity of ferrite material at high temperatures (all known ferrites have a negative temperature coefficient of the electric resistance).

According to the invention, increased electric conductivity of the material to be melted is preferably provided by adding to it magnetic ferric oxide ($Fe_3O_4$), which, as is well-known, has a specific resistance much lower than that of other ferrites. In order that the electric conductivity may be maintained at a high value during heating, it is preferable to heat the mass in a surrounding gaseous atmosphere poor of oxygen. The gaseous atmosphere poor of oxygen which is used is preferably an atmosphere of nitrogen. Since an excess of bivalent iron in ferrite material for high-frequency use is undesirable in view of the resultant high electro-magnetic losses, it is preferred, after the melting temperature of the mass has been attained, to increase, preferably gradually, the oxygen content of the surrounding gaseous atmosphere until the oxygen pressure is approximately equal to the equilibrium pressure of the oxygen for the desired ferrite at the melting temperature.

The melting process must take place as far as possible in crucibles manufactured from a material which (a) Is not chemically attacked by oxygen at about the melting temperature and/or by the molten ferrite mass (b) Retains its coherence at the melting temperature so that the crucible does not crack.

A material which satisfactorily fulfills said requirements is aluminum oxide which has been heated beforehand to at most some tens of degrees centigrade below its melting point. However, if desired, use may alternatively be made of crucibles consisting of a high-melting alloy of platinum with iridium and/or rhodium.

It is desirable to cover the crucible by a metallic plate, which is heated in the high-frequency field at the same time as the mass to be melted. Since the metal has an electric conductivity higher than that of the melt, the temperature of the metal is higher than that of the melt. A metal which is very well serviceable for this purpose is required to be resistant against heating to approximately 1700° C. in oxygen. An iridium plate, for example, gives satisfactory results. The metal plate prevents the surface of the melt from becoming colder, due to radiation, than the remaining part of the melt so that premature solidification might occur at this surface.

The melted ferrite mass may be introduced into moulds so that, upon solidification, bodies of any desired shape for electromagnetic use may be obtained.

The invention will now be explained more fully with reference to an example in which the manufacture of manganese ferrite $MnFe_2O_4$ is described.

A chamotte crucible 1 (see the accompanying drawing) is filled for the greater part with aluminum-oxide powder 2. Pressed into this powder is a crucible 3 consisting of aluminum oxide which has been heated to closely below its melting point. Secured to the outer side of the crucible 3 is a thermal element 4 consisting of platinum/platinum-rhodium. Subsequently, some discs of magnetic ferric oxide, $Fe_3O_4$, are introduced into the crucible 3, which have a total weight of 60.2 gms. and which are relatively separated by thin layers 6 of manganous-manganic oxide, $Mn_3O_4$, having a total weight of 29.8 gms. An iridium plate 7 is then deposited on the crucible 3. The assembly is placed in a receiver 8 of hard glass on a table 9. The glass receiver 8 is movable in a high-frequency coil 10 and comprises a gas supply conduit 11 and a gas discharge conduit 12. Pure nitrogen is led through the conduit 11 to the space inside the receiver 8, whereafter the high-frequency current is switched-on. At first slow heating takes place for 2 hours until the thermal element 4 indicates a voltage of 15.0 millivolts, which means that the contents of the crucible are heated to closely below their melting point. Now, the supply of nitrogen is gradually discontinued and replaced by a supply of oxygen. At the temperature attained in the meantime, the contents of the crucible have an electric conductivity such that the temperature of the crucible may be maintained by a slight increase of the high-frequency current, viz. from 72 to 75 amps. After about 10 minutes, whilst maintaining the atmosphere of oxygen in the glass receiver 8, the temperature is raised to the melting temperature of the contents of the crucible of about 1600° C., the thermal element 4 then indicating a voltage of 15.6 millivolts and the high-frequency current being about 77 amps. The molten mass is kept for 5 minutes at the temperature thus obtained and is subsequently cooled at a very low rate until solidification of the entire mass and the thermal element 4 indicating a voltage of 15.0 millivolts. After solidification, a further cooling takes place in two stages. At first, a rapid cooling takes place to about 1300° C. (at which the thermal element 4 indicates a voltage of 12 millivolts), in order to counteract undesired oxidation of the manganese ferrite in the atmosphere of oxygen (as is well-known, bivalent manganese may gradually change to a higher valency stage and this is naturally undesirable for ferrite). When the temperature of 1300° C. is attained, nitrogen is again led into the receiver 8, whereafter slow cooling takes place for some hours to room temperature by gradually decreasing the high-frequency current.

After the cooling process is terminated, the crucible 3 is filled with cooled manganese ferrite, $MnFe_2O_4$, the surface of which has a great brilliance. A ferrite ring having an outer diameter of 1.5 mms. and a height of 5 mms. is cut from the contents of the crucible. The initial permeability $\mu_0$ of the ferrite obtained is 380 and the loss factor tan $\sigma$ at a frequency of 10 kcs./s. is 0.015. For the "apparent" density a value of 4.87 was found, whereas the X-ray density is 4.99.

What we claim is:

1. A method for manufacturing a ferromagnetic ferrite comprising the steps placing a mixture of a bivalent metal oxide and magnetic ferric oxide ($Fe_3O_4$) in proportions forming a ferrite in an aluminum oxide container, inductively heating said mixture in a substantially oxygen-free inert atmosphere to melt the same, increasing the oxygen content of the surrounding atmosphere while continuing to heat said mixture until all the bivalent iron is oxidized, and then cooling the melt to room temperature to form thereby a solid ferromagnetic ferrite constituted by substantially homogeneous cubic crystals having a spinel crystal structure.

2. A method for manufacturing a ferromagnetic ferrite comprising the steps of placing a mixture of manganous-manganic oxide ($Mn_3O_4$) and magnetic ferric oxide ($Fe_3O_4$) in proportions forming a ferrite in an aluminum oxide container, inductively heating said mixture in a substantially oxygen-free inert atmosphere to melt the same, increasing the oxygen content of the surrounding atmosphere while continuing to heat said mixture until all the bivalent iron is oxidized, and then cooling the melt to room temperature to form thereby a solid ferromagnetic ferrite constituted by substantially homogeneous cubic crystals having a spinel crystal structure.

3. A method for manufacturing a ferromagnetic ferrite comprising the steps of placing a mixture of manganous-manganic oxide ($Mn_3O_4$) and magnetic ferric oxide ($Fe_3O_4$) in proportions forming a ferrite in an aluminum oxide container, inductively heating said mixture in a nitrogen atmosphere to melt the same, replacing said nitrogen atmosphere with oxygen while continuing to heat said mixture until all the bivalent iron is oxidized, and then cooling the melt to room temperature to form thereby a solid ferromagnetic ferrite constituted by substantially homogeneous cubic crystals having a spinel crystal structure.

4. The method of claim 3 in which the container is covered by a plate consisting of a high temperature melting metal that is unoxidized at temperatures up to about 1700° C.

5. The method of claim 4 in which the plate consists of iridium.

6. A method for manufacturing a magnetic manganese ferrite which comprises the steps of placing a mixture of magnetic ferric oxide (Fe₃O₄) and manganous-manganic oxide (Mn₃O₄), in an aluminum oxide container, inductively heating said mixture to a temperature slightly below the melting point thereof in a nitrogen atmosphere, removing the nitrogen atmosphere and replacing it by an oxygen atmosphere, thereafter heating the mixture to a temperature above its melting point, slowly cooling the melt until it solidifies to form a solid body, rapidly cooling said solid body to about 1300° C., removing the oxygen atmosphere and replacing it with a nitrogen atmosphere, and thereafter slowly cooling the body to room temperature, whereby the body consists of a ferromagnetic ferrite constituted by substantially homogeneous cubic crystals having a spinel crystal structure.

References Cited in the file of this patent
UNITED STATES PATENTS

| | | |
|---|---|---|
| 1,378,189 | Northrup | May 17, 1921 |
| 1,768,869 | Uhlmann | July 1, 1930 |
| 1,821,208 | Dahlberg | Sept. 1, 1931 |
| 2,038,251 | Vogt | Apr. 21, 1936 |
| 2,274,287 | York et al. | Feb. 24, 1942 |
| 2,324,864 | Milligan | July 20, 1943 |
| 2,365,720 | Neighbors | Dec. 26, 1944 |
| 2,418,467 | Ellis et al. | Apr. 8, 1947 |
| 2,452,531 | Snoek | Oct. 26, 1948 |
| 2,502,130 | Downs et al. | Mar. 28, 1950 |
| 2,526,687 | Reams | Oct. 24, 1950 |